United States Patent
Bianchi

(10) Patent No.: US 9,849,647 B2
(45) Date of Patent: Dec. 26, 2017

(54) STACKABLE AUTOMOTIVE WATER SHIELDS INCLUDING A CHANNEL WITH INWARDLY ANGLED WALLS CONTAINING AN ADHESIVE

(71) Applicant: Unique Fabricating, Inc., Auburn Hills, MI (US)

(72) Inventor: Daniel Bianchi, Auburn Hills, MI (US)

( * ) Notice: Subject to any disclaimer, the term of this patent is extended or adjusted under 35 U.S.C. 154(b) by 0 days.

(21) Appl. No.: 15/349,346

(22) Filed: Nov. 11, 2016

(65) Prior Publication Data

US 2017/0057199 A1 Mar. 2, 2017

Related U.S. Application Data

(62) Division of application No. 14/663,743, filed on Mar. 20, 2015, now Pat. No. 9,517,736.

(51) Int. Cl.

| | | |
|---|---|---|
| *B32B 3/28* | (2006.01) | |
| *B60R 13/08* | (2006.01) | |
| *B62D 65/06* | (2006.01) | |
| *B32B 37/12* | (2006.01) | |
| *B32B 41/00* | (2006.01) | |
| *B60R 13/07* | (2006.01) | |

(Continued)

(52) U.S. Cl.
CPC .................. *B32B 3/28* (2013.01); *B32B 3/08* (2013.01); *B32B 3/26* (2013.01); *B32B 7/045* (2013.01); *B32B 7/14* (2013.01); *B32B 27/08* (2013.01); *B32B 37/1207* (2013.01); *B32B 37/1292* (2013.01); *B32B 41/00* (2013.01); *B60J 5/0418* (2013.01); *B60R 13/07* (2013.01); *B60R 13/0892* (2013.01); *B62D 65/06* (2013.01); *B32B 2037/1215* (2013.01); *B32B 2250/22* (2013.01); *B32B 2250/24* (2013.01); *B32B 2307/546* (2013.01); *B32B 2307/7265* (2013.01); *B32B 2307/732* (2013.01); *B32B 2405/00* (2013.01); *B32B 2605/00* (2013.01); *B32B 2605/08* (2013.01); *B32B 2607/00* (2013.01); *B60R 2013/0807* (2013.01)

(58) Field of Classification Search
CPC ......... B32B 3/28; B32B 3/08; B32B 37/1207; B32B 37/1292; B32B 7/14; B32B 27/00; B32B 41/00; B32B 2605/08; B32B 2605/00; B32B 2037/1215; B32B 2607/00; B32B 2307/7265; B60R 13/0892; B60R 13/07; B60R 2013/0807; B62D 65/06; B60J 5/0418
See application file for complete search history.

(56) References Cited

U.S. PATENT DOCUMENTS

| | | |
|---|---|---|
| 2,974,078 A | 3/1961 | Petritz |
| 5,322,722 A | 6/1994 | Rozenberg |

(Continued)

*Primary Examiner* — Brent W Herring
(74) *Attorney, Agent, or Firm* — Panagos Law Group PLLC; Bill Panagos; Dan Checkowsky

(57) ABSTRACT

A stackable water shield comprising a body portion having a width and length and thickness, said body having a wet surface, said body further having a channel formed between inwardly angled walls in a portion of the body, said channel having a width and a depth sufficient to accept a sufficient amount of glue, said glue amount not extending to the wet surface of the water shield, said water shields stackable without interposing a glue protective barrier such as a release sheet between said stacked water shields.

6 Claims, 2 Drawing Sheets

(51) Int. Cl.
*B32B 3/08* (2006.01)
*B32B 7/14* (2006.01)
*B60J 5/04* (2006.01)
*B32B 7/04* (2006.01)
*B32B 27/08* (2006.01)
*B32B 3/26* (2006.01)

(56) References Cited

U.S. PATENT DOCUMENTS

| | | |
|---|---|---|
| 6,092,854 A | 7/2000 | Campbell |
| 6,541,098 B2* | 4/2003 | Venkatasanthanam B29C 47/0021 156/244.15 |
| 9,517,736 B2* | 12/2016 | Bianchi .................. B60R 13/07 |
| 2003/0221770 A1 | 12/2003 | Meixner |
| 2016/0272128 A1* | 9/2016 | Bianchi .................. B60R 13/07 |

* cited by examiner

STACKABLE AUTOMOTIVE WATER SHIELDS INCLUDING A CHANNEL WITH INWARDLY ANGLED WALLS CONTAINING AN ADHESIVE

CROSS-REFERENCE TO RELATED APPLICATION

This divisional patent application claims priority to U.S. non-provisional patent application Ser. No. 14/663,743 filed on Mar. 20, 2015.

BACKGROUND

Manufacturing processes for automotive door assemblies can be labor intensive, and may involve multiple steps in order to produce a door panel that is aesthetically pleasing, functionally sound, and protects an automobile from water intrusion.

Generally, an automotive door assembly will include a water shield, which is a sheet of water proof or at least water resistant material that is interposed between the metal door structure and the aesthetic door panel so that water entering the door area during vehicle operation will not be transmitted to the composite door panels and thereby damage the look or feel of the door panel.

In certain previous door assemblies, a water resistant or water proof barrier that is the water shield is transported to a factory or assembly area in stacks with glue pre-applied in the appropriate places on one side of the water shield, and separated from the next water shield in the stack by a removable membrane of release material to protect the glue from sticking to the water shield next to it on the stack. In order to affix the water shield to the door, a worker takes the water shield, removes the protective glue shield release material, sticks the water shield to the door, and then assembles the door panel to the vehicle door. The glue shield release material is waste material that must be removed from the assembly floor work area on a fairly regular basis, or the work area could be overrun with scrap material, thereby making continued assembly difficult.

There is a need for an improved automotive water shield that may be pre-glued and stackable to eliminate waste materials from accumulating on the assembly floor area and to avoid one stacked water shield from slipping into the next.

There is a further need for an improved automotive water shield glued to the door panel that may be precisely placed on a vehicle door panel to improve vehicle quality.

SUMMARY

The automotive stackable water shield disclosed herein may address one or more of the issues with existing automotive water shields. The disclosure relates to a stackable, pre-glued water shield material for use in automotive applications such as, for example, door panels. The water shields are made of, at least in part, water resistant or water proof material that can be formed into a channel between inwardly angled walls.

The channel has a depth sufficient to accommodate a glue bead. The formation and shaping of the channel may be accomplished by molding techniques such as a press, or, by vacuum molding. In this way, the channel is formed in the correct portion of the water shield consistently. It is done in such a way to avoid a channel with the inwardly angled walls from slipping inside another channel with inwardly angled walls from another water shield. In this manner, the water shields are stackable without interposition of a glue protecting membrane because the glue is not exposed for interaction with other panels without action on the part of an assembly worker.

The water shield may be adapted for use with a door panel, or any other panel requiring such an arrangement. In order to achieve a desired fit with a minimal amount of labor cost, a door panel may have a complementary ridge formed therein that accommodates the channel in the water shield and permits the ridge to contact the glue in the channel, thereby securing the water shield to the panel. In this manner, the form and fit on the water shield to the panel can be easily and consistently reproduced. The adhesion of the water shield to the door panel when wet out will leave a crease in the bottom of the channel resulting in a confirmation "witness line" so the assembly worker can confirm that the adhesive is bonded all the way around the water shield. That is, gaps in the witness line indicate non-adhesion. In addition, because it is no longer necessary for a release sheet to be interposed between the stackable water shield to protect the glue bead, scrap is reduced, costs are reduced because there is no need to purchase the removable membrane to protect the glue, and the assembly area work floor is kept relatively clear of waste for this operation. In other embodiments, the water shield may be positioned on the door panel in a prearranged place, and the channel is then deformed to cause the glue to contact the door panel, thereby securing it in place without the need for ridges on the door panel.

DETAILED DESCRIPTION

Figure 1:
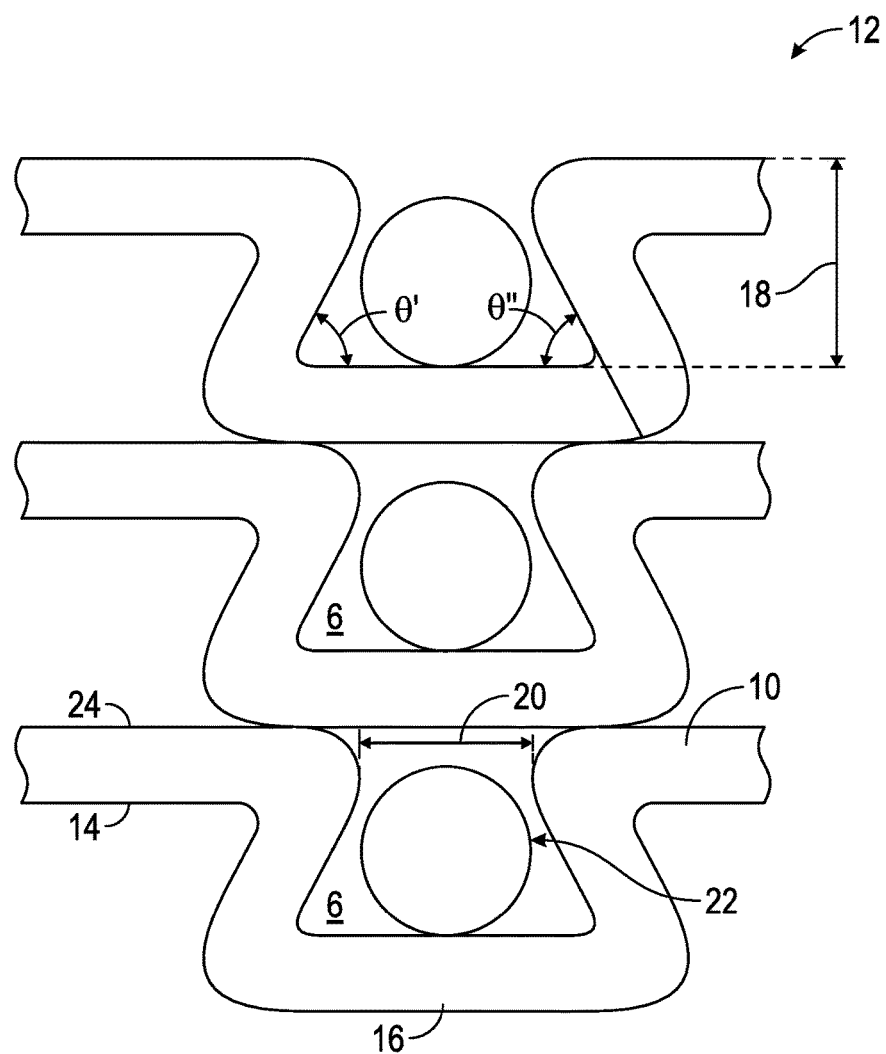
FIG. 1 is an exemplary stack of water shields with angled walls defining channels.
Figure 2:
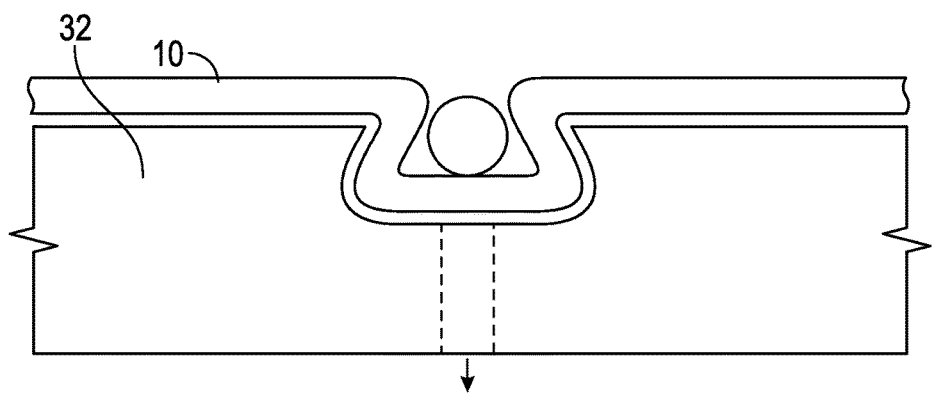
FIG. 2 is a schematic representation of an exemplary angled water shield in a vacuum mold to form the channel defined by angled walls.

Turning now to the Figures wherein like numbers refer to like structures, FIG. 1 is a detailed schematic side view representation of one embodiment of the preformed water shields 10 arranged in stack 12. The water shield 10 has a foam or plastic or other formable body portion 14, into which is formed an inwardly angled channel 6 of sufficient depth 18 and sufficient width 20 to accommodate a glue bead 22 of sufficient amount to form a secure attachment to a substrate, such as a door panel as will be described in reference to FIG. 4. The glue may be any suitable glue, including but not limited to foamed or non-foamed hot melt adhesive. Looking briefly at FIG. 2, the channel 6 is formed in this embodiment by a vacuum molding process where the body portion is placed over a mold 32 and a vacuum and heat applied thereto to cause the body portion to deform into the channel shape as depicted. The shape of channel 6 includes angles Θ' and Θ", which can be the same or different. Generally, angles Θ' and Θ" may be about 40° to about 75°. It is contemplated that the angles can be outside of that range, so so long as the shape of channel 6 formed by angles Θ' and Θ" accommodates the glue and minimizes or prevents slippage of one stacked channel into the adjacent channel. Because of the angling of the walls of channel 6, the channels 6 have wider and substantially planar bases extending between the vertexes of the angled walls than the width of the openings to prevent slippage in stacked arrangements. Angles $\Theta'$ and $\Theta''$ may each have a rounded vertex rather than a sharp vertex, due at least in part to the material comprising the water shield 10.

In the depicted embodiment, the body portion has a thickness of about 4 mm, and the channel is drawn into the vacuum mold such that the channel has a depth of about 7 mm. The channel has a width (in this case 12 mm) that is sized and shaped to accept the glue bead 22, which in this case is shown as 6 mm, with a clearance of about 1 mm on each side of the glue bead 22.

Figure 3:
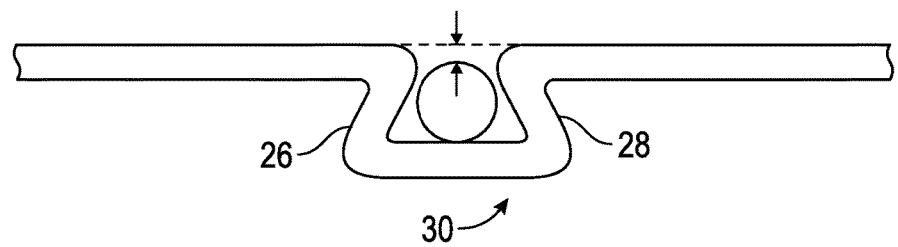
FIG. 3 is an exemplary water shield demonstrating a gap between a glue bead in one channel of a first water shield and a bottom of a second water shield atop the first.

It is important to note that any depth or width of the channel may be formed in any suitable thickness of material, provided that the glue bead 22 that is used does not extend to the wet or water-facing surface 24 of the water shield. It is also to be understood that although the channels 6 are depicted as having angled walls of at a particular angle, it is contemplated as seen in FIG. 3 that the sides 26 and 28 of the channel 6 could form a "die lock" 30 configuration as a result of the vacuum molding process. That is, the die lock 30 may be used to form angled walls within the meaning of the appended claims.

As it is apparent that the glue bead 22 does not extend to the wet surface 24 of the water shield 10, the water shields 10 may be stacked one on the other as seen in FIG. 1 without the need for a protective release sheet interposed between stacked water shields 10 to protect the glue from contact with the next sheet of water shield 10. The elimination of this release sheet eliminates labor, waste and costs associated with the sheet.

Figure 4:
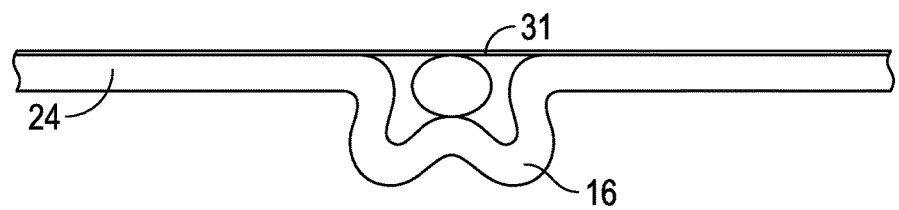
FIG. 4 is a side view of an exemplary water shield with a V-shaped crease in the channel creating a witness line to confirm adherence throughout the channel.

Additionally, as seen in FIG. 4, the wet surface 24 is placed in contact with the door panel 31 and the channel is deformed to press the glue bead into contact with the door panel thereby securing the water shield in place. The deformation into a V-shape creates a witness line. If the deformation is consistent along the length of the channel, adherence is confirmed. If there are gaps in the V-shape where the base of the channel remains substantially planar, a defect in adherence can be identified and addressed. Whatever procedure to adopted for placing the water shield 10 onto the door panel, it can be appreciated that the water shield 10 may be placed onto the door panel in an easy, accurate and reproducible way.

With regard to the processes described, it should be understood that, although the steps of such processes have been described as occurring in a certain sequence, such processes could be practiced with the described steps performed in a different order. It should be understood that certain steps could be performed simultaneously, that other steps could be added, or that certain steps could be omitted.

The entirety of the above description is intended to be merely illustrative. Many embodiments and applications other than the examples provided would be apparent upon reading the above description. The scope of the invention should be determined with reference to the appended claims along with the full scope of equivalents. It is anticipated that future developments will occur, and that the disclosed devices and processes used with such future developments. That is, the invention is capable of variation.

All terms used in the claims are intended to be given their ordinary meanings as understood by those knowledgeable in the described technologies unless an explicit indication to the contrary is made. Also, singular articles such as "a," "the," "said," should be understood to recite one or more of the indicated nouns unless a claim explicitly states otherwise.

The invention claimed is:

1. A stackable water shield comprising a body portion having a width and length and thickness, said body having a wet surface, said body further having a channel between opposed walls inwardly angled relative to a base, one said wall having an inward angle $\Theta'$ and an opposing wall having an inward angle $\Theta''$ such that an opening of the channel is smaller than the base of the channel, said channel extending at least partially along a portion of said water shield; a sufficient to secure attachment to a substrate amount of glue in said channel, said glue amount not extending to a side or the wet surface of the water shield, said water shield stackable one upon the next without interposing a glue protective shield between any said stackable water shield.

2. The stackable water shield of claim 1, wherein said inwardly angled walls flanking the channel are angled such that $\Theta'$ and $\Theta''$ are substantially the same.

3. The stackable water shield of claim 1, wherein said inwardly angled walls are angled such that $\Theta'$ and $\Theta''$ are between about 40 degrees and about 75 degrees.

4. The stackable water shield of claim 1, wherein said channel extends along a perimeter of said water shield body.

5. The stackable water shield of claim 1, wherein said glue comprises hot melt adhesive.

6. The stackable water shield of claim 1, wherein said channel has a die lock configuration.

* * * * *